United States Patent [19]

Taylor

[11] Patent Number: 4,553,403
[45] Date of Patent: Nov. 19, 1985

[54] TRANSPORT REFRIGERATION AIR SYSTEM

[75] Inventor: David H. Taylor, Bloomington, Minn.

[73] Assignee: Thermo King Corporation, Minneapolis, Minn.

[21] Appl. No.: 612,490

[22] Filed: May 21, 1984

[51] Int. Cl.$^4$ ............................................. F24F 7/06
[52] U.S. Cl. ........................................ 62/239; 34/225; 62/407; 98/31.6
[58] Field of Search ......................... 62/239, 407, 408; 98/32, 33 R; 34/224, 225

[56] References Cited

U.S. PATENT DOCUMENTS

| | | | |
|---|---|---|---|
| 533,454 | 2/1895 | Fryslie | 98/32 |
| 2,119,261 | 5/1938 | Andrews | 34/224 X |
| 2,184,484 | 12/1939 | Bojner | 98/33 R |
| 2,937,510 | 5/1960 | Allyne | 62/408 X |
| 4,460,122 | 7/1984 | Jardinier et al. | 98/33 R X |

Primary Examiner—William E. Tapolcai
Attorney, Agent, or Firm—E. C. Arenz

[57] ABSTRACT

A refrigerated trailer 10 which is subject to having a restricted normal return air flow path back to the refrigeration unit 24 through the suction space 46 in communication with the return air inlet 34 of the unit, due to volume and arrangement of the load 42, is provided with secondary air return ducts 48 and 50 which are also in communication with the suction space 46 to ensure an adequate return air flow to the unit and thereby also assuring an adequate discharge of air to the rear 22 of the trailer.

7 Claims, 4 Drawing Figures

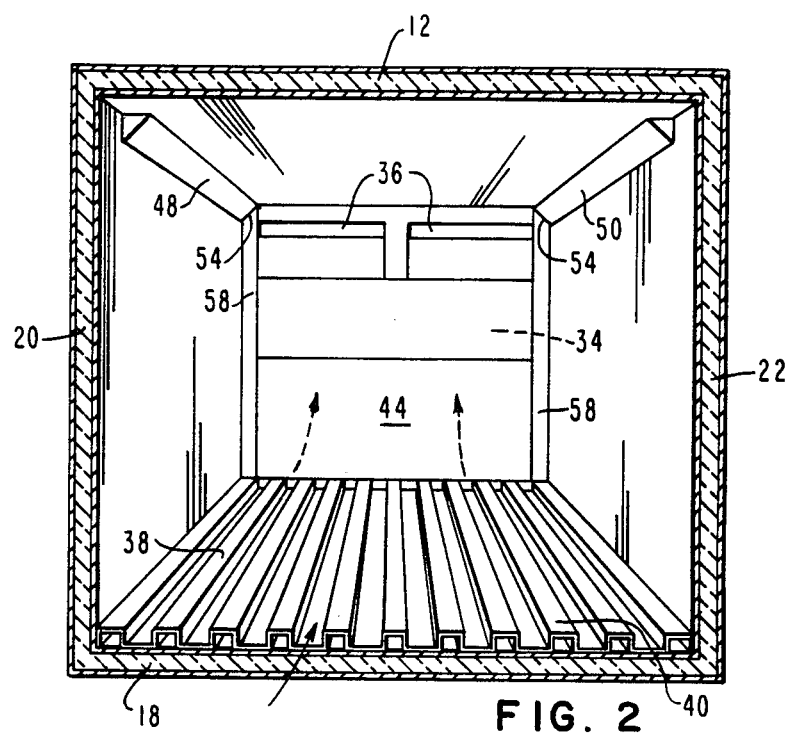
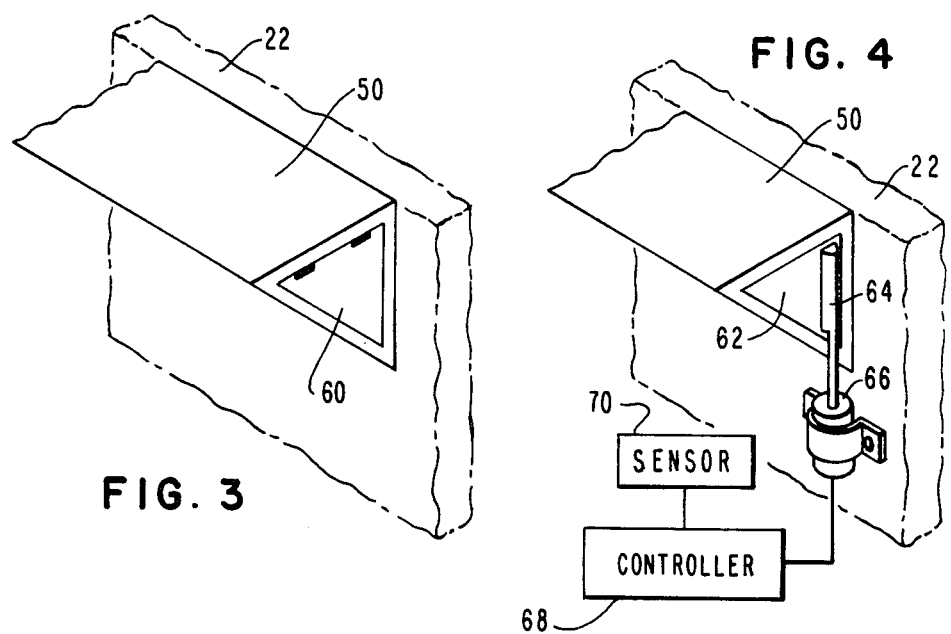

TRANSPORT REFRIGERATION AIR SYSTEM

BACKGROUND OF THE INVENTION

The invention pertains to transport refrigeration systems and in particular to an air flow system for a refrigerated container such as a refrigerated trailer with a forced convection heat transfer system.

It is important that the air circulation within such containers be adequate for several reasons. Air should be delivered throughout the load and wipe the interior walls and floors to accomplish the required heat transfer to maintain trailer and load temperature at the proper level. The air delivered through the evaporator coil should be adequate to transfer heat without excessive temperature differences in the air. With highly restricted air circulation, the air temperature leaving the evaporator will be very low for loads being cooled and very high for loads requiring heating. In either case, the commodity being carried within the trailer can suffer from overheating or overcooling. If there is a reduced air flow the velocity from the evaporator air outlet is reduced, which in turn reduces the throw of air toward the rear of the trailer.

It is known that for reasons of overall economy the users of trailers wish to maximize the volume within the trailer, which tends to minimize the space available for air flow. It is also known that for structural and economy reasons, many trailers are constructed with a corrugated duct board type of floor which is known to be less desirable for return air flow under the load to the refrigeration unit than the so-called high profile T section type of floor.

In virtually all cases it is desirable that an adequate quantity of air reach the rear portion of the trailer. One way of doing this is to use a longitudinally extending duct along the centered ceiling of the trailer and connecting it to the outlet of the refrigeration unit. Some objections to this centered duct system is that the ducts are subject to being easily damaged by fork trucks, are unsanitary, and expensive to maintain. Other arrangements for improving air circulation and air temperature control are Venturi-type devices associated with the outlet of the transport refrigeration unit and are exemplified by U.S. Pat. Nos. 3,792,595, 3,447,336 and 2,780,923. Such devices are also subject to being easily damaged and do not assure that an adequate quantity of air will reach the rear of the trailer.

The aim of this invention is to provide an air flow system which operates to assure a supply of air to the rear portion of the trailer and to assure a return of air to the unit, irrespective of severe restrictions in the conventional return air path to the refrigeration unit, so that at all times there is adequate air flow through the unit evaporator coil and thus extreme temperature differences across the coil are avoided.

SUMMARY OF THE INVENTION

In accordance with the invention, an air flow system is provided for a perishable cargo container, such as one having a generally right parallelepiped interior shape, including a transport refrigeration unit having an evaporator and fan means for inducing air flow through a suction space downstream of the evaporator and through the evaporator, the unit being mounted at the front end wall of the container in a generally horizontally centered relation, having a conditioned air outlet in its top portion for directing air toward the rear end of the container, and a return air inlet in its bottom portion in communication with a suction space and a floor return space below the cargo space, duct means in each of the upper side corners of the container and extending rearwardly for at least the major portion of the length of the container, the rearward ends of said ducts being open or subject to being open, means connecting the forward ends of the ducts with the suction space, the duct means providing a second return path operable to provide return flow therethrough from the rear of the container to a degree directly related to the resistance to flow return through the floor return space.

DRAWING DESCRIPTION

FIG. 2 is a fragmentary perspective view of the interior of a trailer provided with the invention, this view looking toward the interior front wall of the trailer;

FIG. 3 is a fragmentary isometric view of a duct of the invention provided with a flap-type damper as one example for air flow control; and FIG. 4 is a fragmentary isometric view of a duct provided with a positively controlled damper.

DESCRIPTION OF PREFERRED EMBODIMENTS

Figure 1:
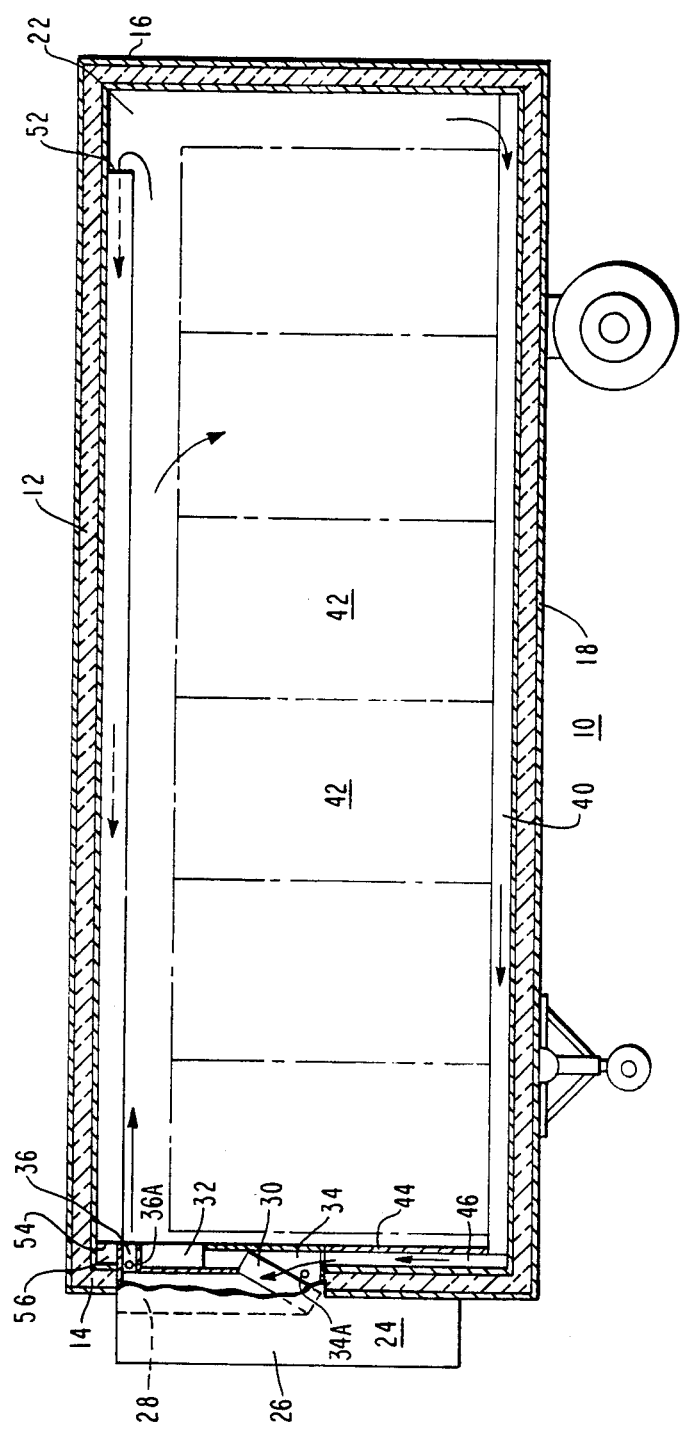
FIG. 1 is a partly broken, partly diagrammatic, partly sectioned, side elevation of a refrigerated trailer provided with the air flow system of this invention.

Referring to FIG. 1, the cargo container is shown in the form of a refrigerated transport trailer 10 which, as is conventional, is of a generally right parallelepiped shape formed by thermally insulated walls including top wall 12, front and rear walls 14 and 16, respectively, the rear wall typically being provided with doors, bottom wall 18, and opposite side walls 20 and 22 (FIG. 2).

A transport refrigeration unit generally designated 24 and which may be of the general type as illustrated in U.S. Pat. No. 4,182,134, and which will be used as an example herein, is mounted at the front of the trailer with the condenser section 26 projecting forwardly of the front wall 14 and with the evaporator section 28 situated in a rectangular opening in the front wall with a part of it projecting forwardly and another part projecting into the trailer interior. In the interest of economizing space in the trailer taken up by the refrigeration unit, such a unit provides a relatively minimal projection into the load space, such as about 4 inches in the case of the particular patented unit noted. The parts of the evaporator section of particular interest in connection with this invention include the heat exchange coil 30 which can function as either a refrigerant evaporator for cooling, or as a heater when supplied with hot refrigerant gas, a fan or blower 32 which induces return air into the return air inlet 34 in the lower portion of the evaporator section 28, through the coil 30 and forces the conditioned air out of the air outlet 36 and toward the rear of the trailer.

Referring to both FIGS. 1 and 2, the floor 38 of the trailer is shown, for example, as of corrugated duct board type construction 40 to provide air flow return spaces from the rear of the trailer to the front thereof below the cargo which is represented by the dashed line rectangles 42 in FIG. 1. While the cargo in FIG. 1 is not shown as nearly completely occupying the interior space of the trailer, there sometimes occur cases where this does happen. To prevent the return air inlet 34 to the evaporator section from being blocked, it is common to provide a partition as at 44 to prevent cargo from being placed any further forward than the partition 44. The partition 44 provides one wall of what is herein called a suction space 46 in communication with the return air inlet 34, and also in communication with the floor return spaces 40 underlying the cargo.

With a properly sized load arranged to provide adequate spaces for good air circulation, the general direction of air flow will be as shown by the solid arrows in FIG. 1. That is, the air will be discharged from outlet 36 to flow over the top of the load and toward the rear of the trailer, with some portion of the air also descending between discrete parts of the cargo to the ducted floor, and a large portion passing to the rear and down to be received by the rearward end of the ducted floor and then flow forwardly through the ducted floor to the suction space 46 under the influence of the blower 32. However, in some instances the quantity of the load and its arrangement may be such that the air system as illustrated by the solid arrows is highly restricted so that the volume of circulation by the fan is significantly decreased. If the refrigeration unit is in a cooling mode, for example, the inadequate air flow across the evaporator coil will cause an inordinate reduction in temperature so that the air being discharged is significantly cooler than proper, and possible top freezing of the load can occur. With the unit thermostat sensing return air, the thermostatic control of the unit is partly lost in that the thermostat controls only on that air temperature, rather than the air temperature leaving the unit. The same condition can occur when the unit is in the heating mode in that the air discharged from the unit will be considerably warmer than it should be.

The air system embodying this invention is intended to remedy the situation of inadequate air return in the conventional way. To this end, at least one, and preferably two, secondary air return ducts 48 and 50 are provided in the upper interior corners formed between the top wall 12 and side walls 20 and 22. These ducts extend at least for the major portion of the length of the trailer and, as currently preferred, to a location closely adjacent the rear interior space of the trailer. The rear ends 52 are basically in open communication with, or subject to being in open communication with, the rear interior space of the trailer. The front ends 54 of the ducts are open to the space 56 behind the partitions 58 at the sides of the refrigeration unit in the particular embodiment shown, the space 56 in turn being in communication with the suction space 46 which leads to the return air inlet 34 of the unit.

It is currently believed that the preferred practice is for the secondary ducts to return negligible air to the unit when the loading quantity and arrangement are such that the normal air flow patterns shown by the solid arrows in FIG. 1 can be used. However, when this path becomes unduly restrictive, it is then desired that the secondary ducts return air from the rear as indicated by the dashed line arrow of FIG. 1 to the unit. Control of the quantity of air returned through the secondary ducts can be accomplished in several ways. One way is to size the secondary ducts to provide restricted flow therethrough until the restriction to flow through the conventional path rises to a degree that significant flow is through the secondary ducts.

Another way is, as shown in FIG. 3, to provide a simple lightweight hinged, flap-type damper 60 which, in response to undue restriction of the conventional air flow path, will open to a degree proportional to that restriction and accordingly permit a proportionally greater amount of flow through the secondary ducts.

The damper may also be arranged to be under positive control for operation in accordance with changes in conditions reflecting a restricted normal return air flow path. Thus in FIG. 4 the damper 62 is mounted on a shaft 64 which is connected to the shaft of a damper operator 66. The damper operator is controlled by controller 68 which converts the signal received from the sensor 70. One form the sensor may take is that of a pair of temperature sensors on the upstream and downstream sides of the evaporator, as for example 34A at the return air inlet 34 and 36A at the air outlet 36, so that the differential in temperature reflects the quantity of air moving through the evaporator coil 30. Thus, for example, if in the cooling mode the temperature differential is significantly greater than would normally be the case, thereby reflecting a restricted normal return air flow path, the damper 62 is operated toward an open position. Alternatively, the sensor 70 may be arranged to sense air velocity or velocity pressure, for example, to give a signal reflecting the air volume.

Partly in summary, some of the beneficial effects from the air flow system of the invention are as follows. At least a given air flow volume is assured through the unit evaporator to avoid overcooling or overheating the discharge air. The system assures that air is positively supplied to the rear of the trailer where much of the heat gain from infiltration and conduction around the doors at the rear can be returned directly to the evaporator. From the standpoint of customer attraction to the system, customers will always be able to feel air movement at the rear of the trailer whether it is full or empty. The energy required to deliver air to the rear of the trailer by the system of the invention is less than would be required if the evaporator air blower were overpowered to assure adequate air to the rear of the trailer irrespective of the loading quantity and arrangement. The thermostatic control exercised by sensing the temperature at the return air inlet of the unit responds better to the real demands of the trailer load without causing an overcooling condition and possible load freezing. On conventional systems where a highly restricted normal air return exists, the return air can continue to call for cooling with a dangerously low discharge temperature which could freeze fresh produce on the top of the load.

I claim:

1. An air flow system for a perishable cargo container having a generally right parallelepiped interior shape to contain the cargo, and having a transport refrigeration unit including an evaporator and fan means for effecting air flow through a suction space downstream of said evaporator and through said evaporator, the unit being mounted at the front end wall of the container in generally horizontally-centered relation, and having a conditioned air outlet in its top portion for discharging air toward the rear end of the container and a return air inlet in its bottom portion in communication with said suction space and a normal air flow return space below the cargo space, comprising
   duct means in at least one of the upper side corners of said container and extending rearwardly for at least the major portion of the length of said container and adapted to receive air in its rearward end;
   means connecting the forward ends of said ducts with said suction space;

said duct means providing a secondary air flow return path operable to provide return flow therethrough from the rear of the container to a degree related to the overall resistance to air flow return of that return which is through said floor return space.

2. A system according to claim 1 wherein:

said duct means are provided in both said upper side corners of said container.

3. A system according to claim 2 wherein:

both said duct means are triangular in cross-section.

4. A system according to claim 1 including:

damper means in said duct means operable in an opening direction in response to a given increase in said overall resistance in the normal air flow return path.

5. A system according to claim 4 wherein:

said damper means comprises a flap-type damper responsive to the air pressure differential thereacross.

6. A system according to claim 4 wherein:

said damper means is positively controlled in response to changes in temperature differential of the air on opposite sides of said evaporator.

7. A system according to claim 4 wherein:

said damper means is positively controlled in response to changes in air volume through said evaporator.

* * * * *